Patented Oct. 4, 1932

1,881,195

UNITED STATES PATENT OFFICE

OSCAR KASELITZ, OF BERLIN, GERMANY

PROCESS OF PRODUCING MAGNESIUM AMMONIUM PHOSPHATE

No Drawing. Application filed June 17, 1929, Serial No. 371,719, and in Germany December 6, 1928.

My invention refers to the production of a fertilizer product and more particularly to means whereby such product can be obtained in a particularly simple and efficient manner at particularly low costs.

As is well known to those skilled in the art, many soils, more especially light soils and tropical soils require the introduction of magnesium. As shown by Schneidewind ("Die Ernährung der landwirtschaftlichen Kulturpflanzen", 5th Edition, 1922, p. 117) the available, readily soluble magnesium salts such as for instance magnesium chloride, are not adapted for use as fertilizers, no beneficial effect being obtained by the introduction of such salts into the soil. It has also been found that these salts frequently cause plasmolytical injury to the plants.

It is therefore important to provide a magnesium salt which does not readily dissolve in water and which is at the same time easily available and as free as possible from inert substances and obnoxious anions.

I have now found that the double salt magnesium ammonium phosphate which is quite particularly adapted for use as a fertilizer can be produced at particularly low costs by utilizing the residual liquors (foots or waste liquors) resulting in the recovery of potash salts from minerals containing same. I have further found that in the recovery of phosphoric acid and phosphates greater quantities of solutions of low concentration are obtained, from which concentrated phosphoric acid cannot be recovered in view of the costs. By combining these two cheap raw materials, the waste liquors from the potash manufacture and the diluted phosphoric acid or phosphate solutions, I am enabled to produce a high-grade fertilizer.

In practising my invention I prefer proceeding as follows:

The dilute solutions containing phosphoric acid or phosphates, which are obtained in the manufacture of phosphoric acid, are mixed with a potash waste liquor, in excess, which may be diluted. To this mixture, which is preferably slightly heated, so much ammonia is added, that the phosphoric acid in the solution is neutralized. There is then obtained a crystalline precipitate, which is freed from the adhering mother liquor by washing with water and can be dried at a temperature not materially exceeding 100° C. In order to obtain a fertilizer which is almost free from inert matter, the heating of the crystalline mass can be continued, until five of the six mol. crystal water have been evaporated.

The fertilizer thus obtained is a dust-like mass, excellently adapted for scattering, which contains about 45.7% $P_2O_5$, 9.0% N, 25.9% MgO and only 11.6% water.

In view of its excellent physical condition this mass is also particularly adapted for the manufacture of mixed fertilizers even if the components to be admixed to them are of a hydroscopic or otherwise unfavorable character, because these undesirable properties are altogether removed by mixing with this mass.

By mixing equal parts of magnesium ammonium phosphate above described and ammonium nitrate I obtain a mixed fertilizer containing about 22.6% $PO_4$, 21.5% N and 12.7% Mg, which after having been stored full four weeks could be scattered as readily as before, in contra-distinction to ammonium nitrate stored under the same conditions, which had attracted moisture and had caked.

As compared with other non-readily soluble magnesium salts the magnesium ammonium phosphate, apart from the contents of three fertilizing components (P, N and Mg) and from the lack of inert matter, presents the further advantage that it furnishes directly the constituents required by the plants for the composition of the nucleo-proteids.

The mother liquors and washwaters obtained during the process contain free ammonia in excess and ammonium chloride in proportion to the magnesium contents of the final product. On adding lime in excess the entire nitrogen in the liquors is expelled by heating in the form of ammonia and is recovered as such so that these liquors now contain only valueless constituents.

*Example.*—To 1 kg of a 10% phosphoric acid is gradually added 1 kg of a potassium waste liquor, previously diluted with water, which contains 11% magnesium chloride. To the mixture which is heated to about 40° C., 300 g. of a 20% ammonia solution are added. The precipitate which forms at first, is allowed to stand for some hours and during this time assumes a denser crystalline form which facilitates its separation from the mother liquor. The precipitate is now filtered by suction and washed with some water. There are obtained 270 grams of the still wet product which after drying at 100° C. result in 157 g. final product constituted as above described.

Various changes may be made in the details disclosed in the foregoing specification without departing from the invention or sacrificing the advantages thereof.

In the claims affixed to this specification no selection of any particular modification of the invention is intended to the exclusion of other modifications thereof.

I claim:

1. The process of making magnesium ammonium phosphate comprising mixing waste liquors containing magnesium chloride and resulting in the recovery of potash salts from minerals containing same with a dilute solution resulting in the manufacture of phosphoric acid and containing a phosphorus compound, so as to produce a mixture containing more magnesium than corresponds to the proportion 2 Mg : 1 $P_2O_5$, adding to the mixture a sufficient quantity of ammonia to precipitate substantially all the phosphorus in the form of ammonium-magnesium phosphate, separating the precipitate from the mother liquor, adding lime to the mother liquor heating same to expel ammonia, and reusing the ammonia thus recovered for the production of another quantity of ammonium-magnesium phosphate.

2. The process of making magnesium ammonium phosphate comprising mixing 100 parts by weight of a 10% phosphoric acid solution with 100 parts of a potassium waste liquor containing 11 per cent magnesium chloride, heating the mixture to about 40° C., adding 30 parts of a 20% ammonia solution, separating the crystalline precipitate and washing and drying same.

In testimony whereof I affix my signature.

OSCAR KASELITZ.